US006785282B1

(12) United States Patent
Gardner

(10) Patent No.: US 6,785,282 B1
(45) Date of Patent: *Aug. 31, 2004

(54) SYSTEM AND METHOD FOR CONNECTING A CALL WITH A GATEWAY SYSTEM

(75) Inventor: Michael Joseph Gardner, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/219,125

(22) Filed: Dec. 22, 1998

(51) Int. Cl.[7] .............................................. H04L 12/56
(52) U.S. Cl. .............................. 370/395.2; 370/395.3; 370/395.64; 370/466; 370/410; 379/88.17; 379/88.21
(58) Field of Search ................................ 370/351–356, 370/401, 410, 395.3, 400, 395.2, 426, 389, 392, 395.1, 397, 395.6, 395.64, 465, 466, 467, 474, 522; 379/219, 88.17, 220.01, 88.21, 221.08, 221.09, 221.1, 229, 230, 242, 243, 244

(56) References Cited

U.S. PATENT DOCUMENTS

| | | | |
|---|---|---|---|
| 4,201,889 A | 5/1980 | Lawrence et al. |
| 4,348,554 A | 9/1982 | Asmuth |
| 4,720,850 A | 1/1988 | Oberlander |
| 4,748,658 A | 5/1988 | Gopal et al. |
| 4,763,317 A | 8/1988 | Lehman |
| 4,926,416 A | 5/1990 | Weik |
| 4,979,118 A | 12/1990 | Kheradpir |
| 4,991,204 A | 2/1991 | Yamamoto et al. |
| 5,051,983 A | 9/1991 | Kammerl |
| 5,067,123 A | 11/1991 | Hyodo et al. |
| 5,084,867 A | 1/1992 | Tachibana et al. |
| 5,089,954 A | 2/1992 | Rago |
| 5,091,903 A | 2/1992 | Schrodi |
| 5,101,404 A | 3/1992 | Kunimoto et al. |
| 5,115,427 A | 5/1992 | Johnson, Jr. et al. |
| 5,130,974 A | 7/1992 | Kawamura et al. |
| 5,168,492 A | 12/1992 | Beshai et al. |
| 5,182,550 A | 1/1993 | Masuda et al. |
| 5,204,857 A | 4/1993 | Obara |
| 5,216,669 A | 6/1993 | Hofstetter et al. |
| 5,218,602 A | 6/1993 | Grant et al. |
| 5,239,539 A | 8/1993 | Uchida et al. |
| 5,249,178 A | 9/1993 | Kurano et al. |
| 5,251,255 A | 10/1993 | Epley |
| 5,255,266 A | 10/1993 | Watanabe et al. |
| 5,289,536 A | 2/1994 | Hokari |
| 5,291,492 A | 3/1994 | Andrews et al. |
| 5,327,421 A | 7/1994 | Hiller et al. |
| 5,339,318 A | 8/1994 | Tanaka et al. |
| 5,345,443 A | 9/1994 | D'Ambrogio et al. |
| 5,345,445 A | 9/1994 | Hiller et al. |

(List continued on next page.)

OTHER PUBLICATIONS

Bauer, Helen.; Kulzer, John J.; Sable, Edward G., "Designing Service–Independent Capabilities for Intelligent Networks," IEEE Communications Magazine, Dec. 1988.

ITU–T Telecommunication Standarization Sector of ITU W. 1219 Intelligent Network, Intelligent Network User's Guide for Capability Set 1, Apr. 1994.

(List continued on next page.)

Primary Examiner—Ajit Patel

(57) ABSTRACT

A system and method for connecting a call in a gateway system comprises a signaling processor for processing call signaling to determine connections for the user communications. A gateway matrix accepts control messages form the signaling processor and accepts user communications from switching systems. In response to the control message, the gateway matrix connects the user communications to the designated connection.

20 Claims, 17 Drawing Sheets

U.S. PATENT DOCUMENTS

| | | |
|---|---|---|
| 5,345,446 A | 9/1994 | Hiller et al. |
| 5,357,510 A | 10/1994 | Norizuki et al. |
| 5,363,433 A | 11/1994 | Isono |
| 5,365,524 A | 11/1994 | Hiller et al. |
| 5,384,771 A | 1/1995 | Isidoro et al. |
| 5,392,402 A | 2/1995 | Robrock, II |
| 5,420,857 A | 5/1995 | Jurkevich |
| 5,422,882 A | 6/1995 | Hiller et al. |
| 5,426,636 A | 6/1995 | Hiller et al. |
| 5,428,607 A | 6/1995 | Hiller et al. |
| 5,428,609 A | 6/1995 | Eng et al. |
| 5,434,852 A * | 7/1995 | La Porta et al. ............ 370/270 |
| 5,446,738 A | 8/1995 | Kim et al. |
| 5,452,296 A | 9/1995 | Shimizu |
| 5,452,297 A | 9/1995 | Hiller et al. |
| 5,459,721 A | 10/1995 | Yoshida |
| 5,461,669 A | 10/1995 | Vilain |
| 5,469,501 A | 11/1995 | Otsuka |
| 5,473,677 A | 12/1995 | D'Amato et al. |
| 5,473,679 A | 12/1995 | La Porta et al. |
| 5,479,401 A | 12/1995 | Bitz et al. |
| 5,483,527 A * | 1/1996 | Doshi et al. ................ 370/399 |
| 5,495,484 A | 2/1996 | Self et al. |
| 5,497,373 A | 3/1996 | Hulen et al. |
| 5,509,010 A * | 4/1996 | La Porta et al. ............ 370/397 |
| 5,513,180 A | 4/1996 | Miyake et al. |
| 5,513,355 A | 4/1996 | Doellinger et al. |
| 5,526,359 A | 6/1996 | Read et al. |
| 5,530,698 A | 6/1996 | Kozaki et al. |
| 5,539,815 A | 7/1996 | Samba |
| 5,539,884 A | 7/1996 | Robrock, II |
| 5,541,917 A | 7/1996 | Farris |
| 5,541,918 A | 7/1996 | Ganmukhi et al. |
| 5,568,475 A * | 10/1996 | Doshi et al. ................ 370/352 |
| 5,579,311 A | 11/1996 | Chopping et al. |
| 5,583,849 A | 12/1996 | Ziemann et al. |
| 5,602,841 A | 2/1997 | Lebizay et al. |
| 5,623,491 A | 4/1997 | Skoog |
| 5,629,930 A | 5/1997 | Beshai et al. |
| 5,636,210 A | 6/1997 | Agrawal et al. |
| 5,703,876 A | 12/1997 | Christie |
| 5,719,863 A | 2/1998 | Hummel |
| 5,765,108 A | 6/1998 | Martin et al. |
| 5,784,371 A | 7/1998 | Iwai |
| 5,787,086 A | 7/1998 | McClure et al. |
| 5,805,568 A | 9/1998 | Shinbashi |
| 5,825,780 A | 10/1998 | Christie |
| 5,844,895 A | 12/1998 | Gradisching |
| 5,889,773 A | 3/1999 | Stevenson, III |
| 5,917,815 A | 6/1999 | Byers et al. |
| 5,920,562 A | 7/1999 | Christie et al. |
| 5,926,482 A | 7/1999 | Christie |
| 5,940,393 A | 8/1999 | Duree et al. |
| 5,940,491 A | 8/1999 | Anderson et al. |
| 5,953,338 A | 9/1999 | Ma |
| 5,982,783 A | 11/1999 | Frey et al. |
| 5,991,301 A | 11/1999 | Christie |
| 5,999,525 A | 12/1999 | Krishnaswamy et al. |
| 6,002,689 A | 12/1999 | Christie et al. |
| 6,005,845 A | 12/1999 | Svennesson et al. |
| 6,009,100 A | 12/1999 | Gausmann et al. |
| 6,016,319 A | 1/2000 | Kshirsagar et al. |
| 6,016,343 A | 1/2000 | Hogan et al. |
| 6,023,474 A | 2/2000 | Gardner et al. |
| 6,026,086 A | 2/2000 | Lancelot et al. |
| 6,026,091 A | 2/2000 | Christie et al. |
| 6,031,840 A | 2/2000 | Christie |
| 6,041,043 A | 3/2000 | Denton et al. |
| 6,081,529 A | 6/2000 | Christie |
| 6,098,094 A | 8/2000 | Barnhouse et al. |
| 6,137,800 A | 10/2000 | Wiley et al. |
| 6,181,703 B1 | 1/2001 | Christie et al. |
| 6,298,043 B1 | 10/2001 | Mauger et al. |
| 6,324,179 B1 | 11/2001 | Doshi et al. |

OTHER PUBLICATIONS

Thorner, "Intelligent Networks," Artech House, 1994, Capter 2, Intelligent Networks, pp. 11–35 and Cahpter 6, New Service Demands in the Future, pp. 97–107.

ITU–T Telecommunication Standardization Sector of ITU Q.722 Specifications of Signalling System No. 7 General Function of Telephone Messages and Signals (Extract from the Blue Book).

McDysan, David E. and Spohn, Darren L., ATM Theory And Application, 1994, p. 256: 9.3.1; ATM Layer VPI/VCI Level Addressing.

Choi, Requirements For ATM Trunking, ATM Forum Technical Committee 95–1401, Oct. 2–6, 1995.

Ohta, S., et al., A Dynamically Controllable ATM Transport Network Based On The Virtual Path Concept, Pp. 1272–1276, Communications For The Information Age, Globecom '88, Conference Record, vol. 111, Nov. 28–Dec. 1, 1988.

Duault, Proposal For ATM Trunking Options, ATM Forum Technical Committee, 95–1230, Oct. 2–6, 1995.

Schink, "CES As A Flexible Trunking Method", ATM Forum Technical Committee 95–1157, Oct. 2–6, 1995.

Caves, Proposed modifications to the baseline text (95–0446R2) of the "VTOA—ATM Trunking For Narrowband Services" SPECIFICATION, ATM Forum Technical Committee 95–1134, Oct. 2–6, 1995.

Kumar, "SAA/VTOA Legacy Voice Service At A Native ATM Terminal", ATM Forum Technical Committee 95–0917R1, Oct. 2–6, 1995.

Barr, W.J., et al., The TINA Initiative, IEEE Communications Magazine, vol. 31, No. 3, New York (US), pp. 70–76, Mar. 1993.

Weisser, F. J., et al., The Intelligent Network And Forward–Looking Technology, IEEE Communications Magazine, vol. 26, No. 12, Dec. 1988, New York (US), pp. 64–69, Dec., 1988.

"IN/B–ISDN Signaling Three Ways Of Integration," Study Group 11, Geneva, ITU—Telecommunication Standardization Sector, Nov. 29–Dec. 17, 1993.

General Recommendations On Telephone Switching And Signaling Intelligent Network—Intelligent Network Distributed Functional Plane Architecture, Q.1204, ITU–T—Mar. 1993.

General Recommendations On Telephone Switching And Signaling Intelligent Network–Intelligent Network Physical Plane Architecture Q.1205, ITU–T Recommendation, Telecommunication Standardization Sector of ITU.

Beckman, Richard T. and Matthews, Joseph R., "Proposal For A Physical Architecture Based On The Harmonized Functional Architecture," Committee T1 Contribution T1S1.5/95–027, Bellcore,. Feb. 20, 1995.

Buhrke, Proposed Unified Functional Model, T1S1.5/95–036, Feb. 1995.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

"Network Signaling," Telephony, TCX12004, University of Excellence, pp 5.8–5.17, Oct. 21, 1991.

McKinney, Scott, "ATM for Narrowband Services" IEEE Communications Magazine, Apr., 1994, New York, US, pp. 64–72.

Faris, F., A Proposed Architecture for the Transport of Compressed VBR Voice Over ATM, Oct. 1–6, 1995, SAA/VTOA Sub Working Group, pp. 1–4.

Kim, Yung, "Voice and Telephony services for an ATM terminal" ATM Forum Technical Committee Service Aspects and Application Sub–working Group, Oct. 2–7, 1995, Honolulu, Hawaii, pp. 1–4.

Kocan Kristin F., Universal Premises Access to Voice Band and ATM Networks Using a Broadband Interworking Gateway, Bell Labs Technical Journal, Apr.–Jun., 1998, 93–108.

Tanabe, Shirou, Taihei, Suzuki, and Ohtsuki, Ken–Ichi, "A New Distributed Switching System Architecture for B–ISDN," International Conference on Integrated Broadband Services and Networks, Oct. 15–18, 1990, The Institution of Electrical Engineers, Savoy Place, London.

Palmer, Rob, "An Experimental ATM Network Featuring De–Coupled Modular Control," Telecom Australia Research Laboratories (Victoria), pp. 118–122 (Nov., 1992).

Thomas F. Laporta, "Distributed Call Processing for Wireless Mobile Networks," Bell Labs Technical Journal, vol. 1 (No. 1), pp. 127–142, (Oct., 1996).

Palmer, Rob, "An Experimental ATM Network for B–ISDN Research," IEEE Region 10 Conference, Melbourne, Australia, Nov. 1992.

* cited by examiner

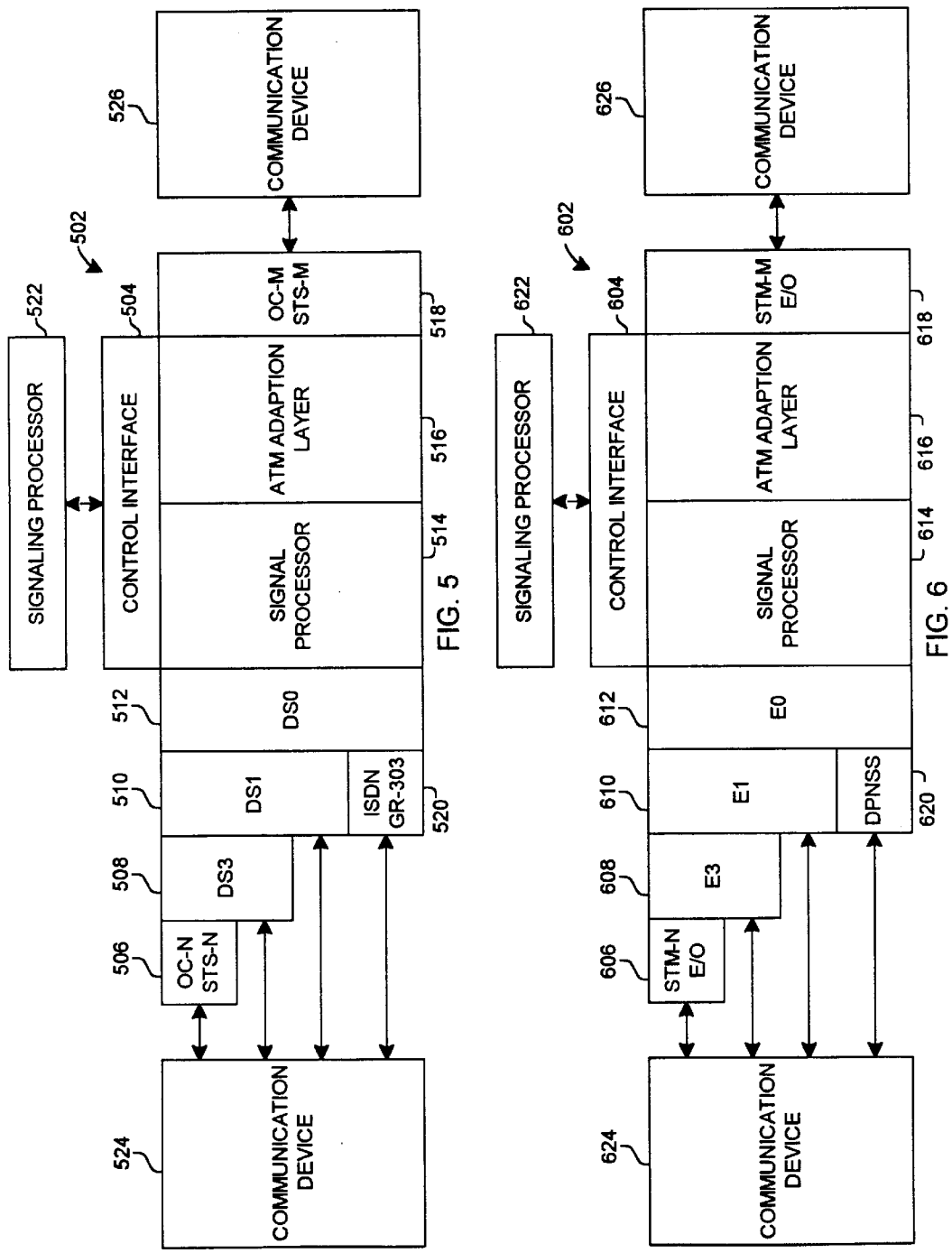

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 12

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 13

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 14A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 14B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

| CARRIER LABEL | CARRIER ID | CARRIER SELECTION | NEXT FUNCTION | NEXT LABEL |
|---|---|---|---|---|
| | | | | |
| | | | | |

FIG. 16

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |

FIG. 17

| OLI LABEL | ORIGINATION LINE INFORMATION | NEXT FUNCTION | NEXT LABEL |
|---|---|---|---|
| | | | |
| | | | |

FIG. 18

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |

FIG. 19

| CALLED NUMBER SCREENING LABEL | CALLED NUMBER | | DELETE DIGITS | NEXT FUNCTION | NEXT LABEL |
|---|---|---|---|---|---|
| | NATURE OF ADDRESS | DIGITS FROM | DIGITS TO | | | |
| | | | | | | |

| CALLED NUMBER LABEL | CALLED NUMBER | | | NEXT FUNCTION | NEXT LABEL |
|---|---|---|---|---|---|
| | NATURE OF ADDRESS | DIGITS FROM | DIGITS TO | | |
| | | | | | |

FIG. 20

| DAY OF YEAR LABEL | DATE | NEXT FUNCTION | NEXT LABEL |
|---|---|---|---|
| | | | |

FIG. 21

| DAY OF WEEK | DAY FROM | DAY TO | NEXT FUNCTION | NEXT LABEL |
|---|---|---|---|---|
| | | | | |

FIG. 22

| TIME OF DAY LABEL | TIME FROM | TIME TO | NEXT FUNCTION | NEXT LABEL |
|---|---|---|---|---|
| | | | | |

FIG. 23

| TIME ZONE LABEL | UTC OFFSET | DAYLIGHT SAVINGS |
|---|---|---|
| | | |

FIG. 24

| ROUTING LABEL | ROUTE NUMBER | NEXT FUNCTION | NEXT LABEL | SIGNAL ROUTE LABEL |
|---|---|---|---|---|
| | | | | |
| | | | | |

FIG. 25

| ORIGINATING TRUNK COS LABEL | TERMINATING TRUNK COS LABEL | NEXT FUNCTION | NEXT LABEL |
|---|---|---|---|
| | | | |
| | | | |

FIG. 26

| TREATMENT LABEL | ERROR/CAUSE LABEL | NEXT FUNCTION | NEXT LABEL |
|---|---|---|---|
| | | | |
| | | | |

FIG. 27

| OUTGOING RELEASE LABEL | LOCATION | OUTGOING CAUSE VALUE | | CAUSE VALUE |
|---|---|---|---|---|
| | | CODING STANDARD | | |
| | | | | |

FIG. 28

| PERCENT LABEL | CONTROL PERCENTAGE | CONTROL | | PASSED | |
|---|---|---|---|---|---|
| | | NEXT FUNCTION | NEXT LABEL | NEXT FUNCTION | NEXT LABEL |
| | | | | | |

FIG. 29

| CALL RATE LABEL | CONTROL | | PASSED | |
|---|---|---|---|---|
| | CALL RATE | NEXT FUNCTION | NEXT LABEL | NEXT FUNCTION | NEXT LABEL |
| | | | | |

FIG. 30

| DATABASE SERVICES LABEL | SERVICE TYPE | SCCP LABEL | TCAP LABEL | NEXT FUNCTION | NEXT LABEL |
|---|---|---|---|---|---|
| | | | | | |

FIG. 31

| SCCP LABEL | MESSAGE TYPE | PROTOCOL CLASS | MESSAGE HANDLING | HOP COUNTER | SEGMENTATION |
|---|---|---|---|---|---|
| | | | | | |

FIG. 32A

| ISNI TYPE | ROUTE INDICATOR | ISNI | | |
|---|---|---|---|---|
| | | MARK INDICATOR | LABEL | |
| | | | | |

FIG. 32B

| | CALLED PARTY ADDRESS | | | | | | | |
|---|---|---|---|---|---|---|---|---|
| | ADDRESS INDICATOR | | | SUB SYSTEM NUMBER | POINT CODE NUMBER | GLOBAL TITLE | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |

| | ADDRESS INDICATOR | | | | CALLING PARTY ADDRESS | | GLOBAL TITLE | | | |
|---|---|---|---|---|---|---|---|---|---|---|
| SSN | POINT CODE | GLOBAL TITLE INDICATOR | ROUTING INDICATOR | NATIONAL/ INTERNATIONAL | SUB SYSTEM NUMBER | POINT CODE NUMBER | TRANSLATION TYPE | ENCODE SCHEME | NUMBER PLAN | ADDRESS TYPE |
| | | | | | | | | | | |
| | | | | | | | | | | |

FIG. 33

| ISNI LABEL | NETWORK 1 | NETWORK 2 | NETWORK 3 | NETWORK ... | NETWORK 16 |
|---|---|---|---|---|---|
| | | | | | |
| | | | | | |

FIG. 34

| TCAP LABEL | TCAP TYPE | TAG CLASS | PACKAGE TYPE | COMPONENT TYPE | MESSAGE TYPE |
|---|---|---|---|---|---|
| | | | | | |
| | | | | | |

FIG. 35

| ECHO CANCELLER LABEL | ECHO CANCELLER TYPE | RS-232 ADDRESS | MODULE |
|---|---|---|---|
| | | | |
| | | | |

FIG. 36

| IWU LABEL | IWU ID | IP SOCKET 1 | IP SOCKET 2 | IP SOCKET 3 | IP SOCKET 4 |
|---|---|---|---|---|---|
| | | | | | |
| | | | | | |

FIG. 37

| CAM INTERFACE LABEL | CAM LABEL | LOGICAL INTERFACE |
|---|---|---|
| | | |
| | | |

| CAM LABEL | CAM TYPE | CAM ADDRESS |
|---|---|---|
| | | |

FIG. 38

| OFFICE CLLI NAME | SITE NODE ID | ORIGINATION ID | SOFTWARE ID | CALL PROCESSOR ID |
|---|---|---|---|---|
| | | | | |

FIG. 39A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
| | | | | | | |

FIG. 39B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
| | | | | | | |

FIG. 39C

| MAX HOP COUNTS | MAX TABLE LOOKUPS |
|---|---|
| | |

FIG. 39D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

FIG. 40A

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

FIG. 40B

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

SYSTEM AND METHOD FOR CONNECTING A CALL WITH A GATEWAY SYSTEM

RELATED APPLICATIONS

Not Applicable

FEDERALLY SPONSORED RESEARCH OR DEVELOPMENT

Not Applicable

MICROFICHE APPENDIX

Not Applicable

1. Field of the Invention

The present invention relates to the field of telecommunications call switching and transport and, more particularly, for connecting calls through a gateway system.

2. Background of the Invention

Broadband systems provide telecommunications providers with many benefits, including greater bandwidth, more efficient use of bandwidth, and the ability to integrate voice, data, and video communications. These broadband systems provide callers with increased capabilities at lower costs.

Telecommunications systems often have a hierarchy of switching systems for connecting calls through local and long distance networks. Where separate networks are interconnected, the grooming and routing of calls typically is accomplished by the use of a cross connect.

However, the use of a cross connect is not efficient for networks that have a high volume of calls. In addition, full interconnection of virtual circuits through cross connects is not manageable. Therefore, there is a need for an improved system for routing calls between interconnecting networks that de-couples the operational interdependency. The present system fulfills these needs.

SUMMARY OF THE INVENTION

The present invention is directed to a gateway architecture system for connecting a call having call signaling and user communications. The system has a signaling processor that receives the call signaling from a first network, processes the call signaling to determine that the call is to be routed to a second network, selects an ATM connection to the second network for the user communications, and transmits a control message identifying the selected ATM connection. The system includes a gateway matrix that receives the user communications from the first network over another ATM connection, receives the control message from the signaling processor, and, in response to the control message, connects the user communications to the ATM connection to the second network.

The present invention also is directed to a gateway architecture system for connecting a call having call signaling and user communications. The system comprises a first network comprising a first communication device. The first communication device is adapted to receive the user communications. A second network comprises a second communication device that is adapted to transport the user communications over an ATM connection. The second network has a signaling processor that receives the call signaling, processes the call signaling to determine that the user communications are to be routed to the first network, selects a second ATM connection to the first network for the user communications, and transmits a control message identifying the selected second ATM connection. The second network also has a gateway matrix that receives the user communications from the second communication device over the ATM connection, receives the control message from the signaling processor, and, in response to the control message, connects the user communications to the selected second ATM connection that leads to the first communication device in the first network.

The present invention further is directed to a system for connecting a call having call signaling and user communications. The system includes a first communication device in a first network that is adapted to transport the user communications. The first communication device does not recognize a destination address for the user communications. The system also includes a second communication device in a second network that is adapted to receive the user communications. The system further includes a first gateway system that is adapted to receive the call signaling and the user communications and to process the call signaling to determine that the destination address for the user communications is the second communication device in the second network. The first gateway system selects an ATM connection to the second network for the second communication device for the user communications and transports the user communications over the ATM connection to the second communication device.

Further, the present invention is directed to a system for connecting a call having call signaling and user communications. The system comprises a first communication device in a first network that is adapted to transport the user communications, wherein a destination for the user communications is outside of the first network. A second communication device in a second network has a destination address and is adapted to receive the user communications. A first gateway system in the first network is adapted to receive the call signaling and the user communications and to process the call signaling to determine the destination for the call in the second network. The first gateway system selects an ATM connection to the second network for the user communications, transports the user communications over the ATM connection to the second network, and transmits new call signaling. A second gateway system in the second network is adapted to receive the user communications over the ATM connection and the new call signaling and to process the new call signaling to determine that the destination for the call is the destination address for the second communication device. The second gateway system routes the user communications to the second communication device over another connection.

BRIEF DESCRIPTION OF THE DRAWINGS

FIG. 5 is a functional diagram of an asynchronous transfer mode interworking unit for use with a synchronous optical network system in accordance with the present invention.

FIG. 6 is a functional diagram of an asynchronous transfer mode interworking unit for use with a synchronous digital hierarchy system in accordance with the present invention.

FIG. 12 is a table diagram of a time division multiplex trunk circuit table used in the signaling processor of FIG. 7.

FIG. 13 is a table diagram of an asynchronous transfer mode trunk circuit table used in the signaling processor of FIG. 7.

FIG. 14A is a table diagram of a trunk group table used in the signaling processor of FIG. 7.

FIG. 14B is a continuation table diagram of the trunk group table of FIG. 14A.

FIG. 14C is a continuation table diagram of the trunk group table of FIG. 14B.

FIG. 15 is a table diagram of a carrier table used in the signaling processor of FIG. 7.

FIG. 16 is a table diagram of an exception table used in the signaling processor of FIG. 7.

FIG. 17 is a table diagram of an originating line information table used in the signaling processor of FIG. 7.

FIG. 18 is a table diagram of an automated number identification table used in the signaling processor of FIG. 7.

FIG. 19 is a table diagram of a called number screening table used in the signaling processor of FIG. 7.

FIG. 20 is a table diagram of a called number table used in the signaling processor of FIG. 7.

FIG. 21 is a table diagram of a day of year table used in the signaling processor of FIG. 7.

FIG. 22 is a table diagram of a day of week table used in the signaling processor of FIG. 7.

FIG. 23 is a table diagram of a time of day table used in the signaling processor of FIG. 7.

FIG. 24 is a table diagram of a time zone table used in the signaling processor of FIG. 7.

FIG. 25 is a table diagram of a routing table used in the signaling processor of FIG. 7.

FIG. 26 is a table diagram of a trunk group class of service table used in the signaling processor of FIG. 7.

FIG. 27 is a table diagram of a treatment table used in the signaling processor of FIG. 7.

FIG. 28 is a table diagram of an outgoing release table used in the signaling processor of FIG. 7.

FIG. 29 is a table diagram of a percent control table used in the signaling processor of FIG. 7.

FIG. 30 is a table diagram of a call rate table used in the signaling processor of FIG. 7.

FIG. 31 is a table diagram of a database services table used in the signaling processor of FIG. 7.

FIG. 32A is a table diagram of a signaling connection control part table used in the signaling processor of FIG. 7.

FIG. 32B is a continuation table diagram of the signaling connection control part table of FIG. 32A.

FIG. 32C is a continuation table diagram of the signaling connection control part table of FIG. 32B.

FIG. 32D is a continuation table diagram of the signaling connection control part table of FIG. 32C.

FIG. 33 is a table diagram of an intermediate signaling network identification table used in the signaling processor of FIG. 7.

FIG. 34 is a table diagram of a transaction capabilities application part table used in the signaling processor of FIG. 7.

FIG. 35 is a table diagram of a external echo canceller table used in the signaling processor of FIG. 7.

FIG. 36 is a table diagram of an interworking unit used in the signaling processor of FIG. 7.

FIG. 37 is a table diagram of a controllable asynchronous transfer mode matrix interface table used in the signaling processor of FIG. 7.

FIG. 38 is a table diagram of a controllable asynchronous transfer mode matrix table used in the signaling processor of FIG. 7.

FIG. 39A is a table diagram of a site office table used in the signaling processor of FIG. 7.

FIG. 39B is a continuation table diagram of the site office table of FIG. 39A.

FIG. 39C is a continuation table diagram of the site office table of FIG. 39B.

FIG. 39D is a continuation table diagram of the site office table of FIG. 39C.

FIG. 40A is a table diagram of an advanced intelligent network event parameters table used in the signaling processor of FIG. 7.

FIG. 40B is a continuation table diagram of the advanced intelligent network event parameters table of FIG. 40A.

FIG. 41 is a table diagram of a message mapping table used in the signaling processor of FIG. 7.

DETAILED DESCRIPTION

Figure 1:
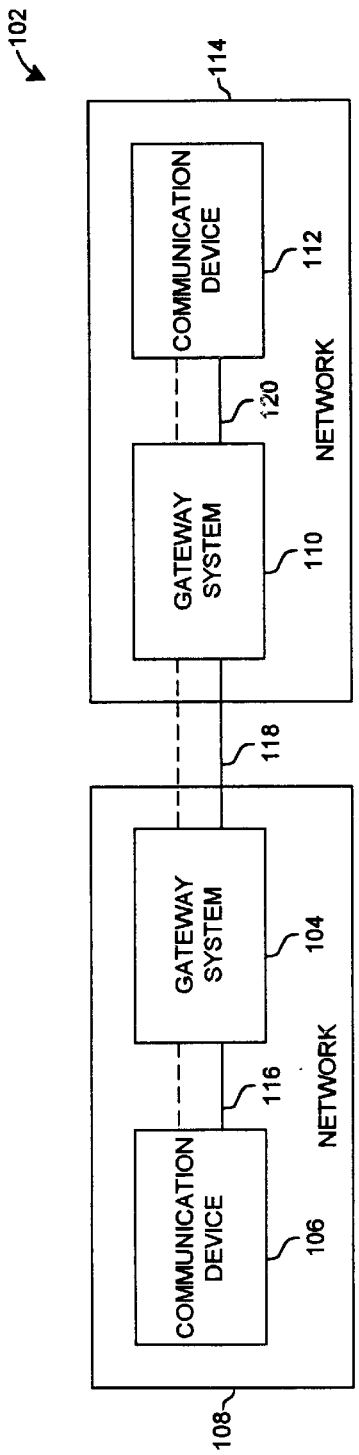
FIG. 1 is a block diagram of a call connection system having networks with gateway systems of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data.

A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, user datagram protocol/internet protocol (UDP/IP), ethernet, digital signal level zero (DS0), or digital signal level one (DS1). In addition, a link, as shown in the figures, can represent a single physical link or multiple links, such as one link or a combination of links of ISDN, SS7, transmission control protocol/internet protocol (TCP/IP), or some other data link. The term "control message" as used herein means a control or signaling message, a control or signaling instruction, or a control or signaling signal, whether proprietary or standardized, that conveys information from one point to another.

The system of the present invention de-couples the operational interdependency between communication systems and networks. The present invention provides an efficient system and method for connecting calls in high call volume environments. The gateway system allows other switching devices to route calls efficiently since, to route calls to other networks, each device only has to route the calls to the gateway system, and the gateway system will route the calls to the required network.

FIG. 1 illustrates an exemplary embodiment of a call connection system of the present invention. The call connection system 102 comprises a first gateway system 104 connected to a first communication device 106 in a first network 108. The call connection system 102 also comprises a second gateway system 110 connected to a second communication device 112 in a second network 114. The first communication device 106 is connected to the first gateway system 104 by a connection 116. The first gateway system 104 is connected to the second gateway system 110 by a connection 118. The second gateway system 110 is connected to the second communication device 112 by a connection 120.

The first and second gateway systems 104 and 110 process call signaling to determine call connections between networks. The first and second gateway systems 104 and 110 connect the user communications, and sometimes call signaling, from virtual path/virtual channels (VP/VC) on connections from a first network to VP/VCs on connections to other networks.

The communication devices 106 and 112 comprise a gateway system, such as the gateway system 104 or 110 or the gateway system to be described below, another network system, customer premises equipment (CPE), an ATM switch, an ATM/time division multiplex (TDM) switch, a cross connect, an interworking unit, or any other device capable of handling a call. CPE can be, for example, a computer, a private branch exchange, or other communication device.

The networks 108 and 114 can be any communication network or device in which calls or other communications are initiated, handled, or terminated. The networks 108 and 114 include ATM network systems.

The communication devices 106 and 112 do not need to be able to determine the destination of the call. If the destination of the call is outside of the network 108 or 114 in which they reside, the communication devices 106 and 112 need only to route the call to the gateway systems 104 and 110, and the gateway systems will route the call to the other gateway system, when required.

As a result of the call setup and routing, the connections are set up from inside each network 108 or 114 to its gateway system 104 or 112. The gateway systems 104 and 110 set up connections to other gateway systems. The receiving gateway system 104 or 110 then sets up connections to the destination communication device 106 or 112 within its network 108 or 114.

The gateway routing function is controlled by the network 108 or 114 receiving the call. The network 108 or 114 does not have specific information of the call's destination and only can determine that the call is to be passed to the network 108 or 114 that has the destination address. To accomplish this routing, the communication devices 106 and 112 within the networks 108 and 114 route the calls to the gateway systems 104 and 110, and the gateway systems route the call to the other networks.

The system of FIG. 1 operates as follows. The first communication device 106 seizes an outgoing VP/VC on a connection 116 and formulates call signaling with an originating point code (OPC) of the first communication device, the destination point code (DPC) of the first gateway system 104, and a circuit identification code (CIC) corresponding to the seized VP/VC on the connection 116. The call signaling is transmitted to the first gateway system 104.

Routing logic in the first gateway system 104 processes the call signaling and determines that the call is to be routed to the second gateway system 110. The first gateway system 104 seizes a VP/VC on an outgoing connection 118 and formulates call signaling with an OPC of the first gateway system, a DPC of the second gateway system 110, and a CIC of the seized VP/VC on the connection 118. The call signaling is transmitted to the second gateway system 110. The VP/VC on the connection 116 is connected to the VP/VC on the connection.

The second gateway system 110 processes the call signaling and determines that the destination for the call is the second communication device 112 within the second network 114. The second gateway system 110 seizes a VP/VC on an outgoing connection 120 to the second communication device 112 and formulates call signaling with an OPC of the second gateway system, a DPC of the second communication device, and a CIC of the seized VP/VC on the connection. The VP/VC on the connection 118 is connected to the VP/VC on the connection 120. At this point, the call is connected.

Figure 2:
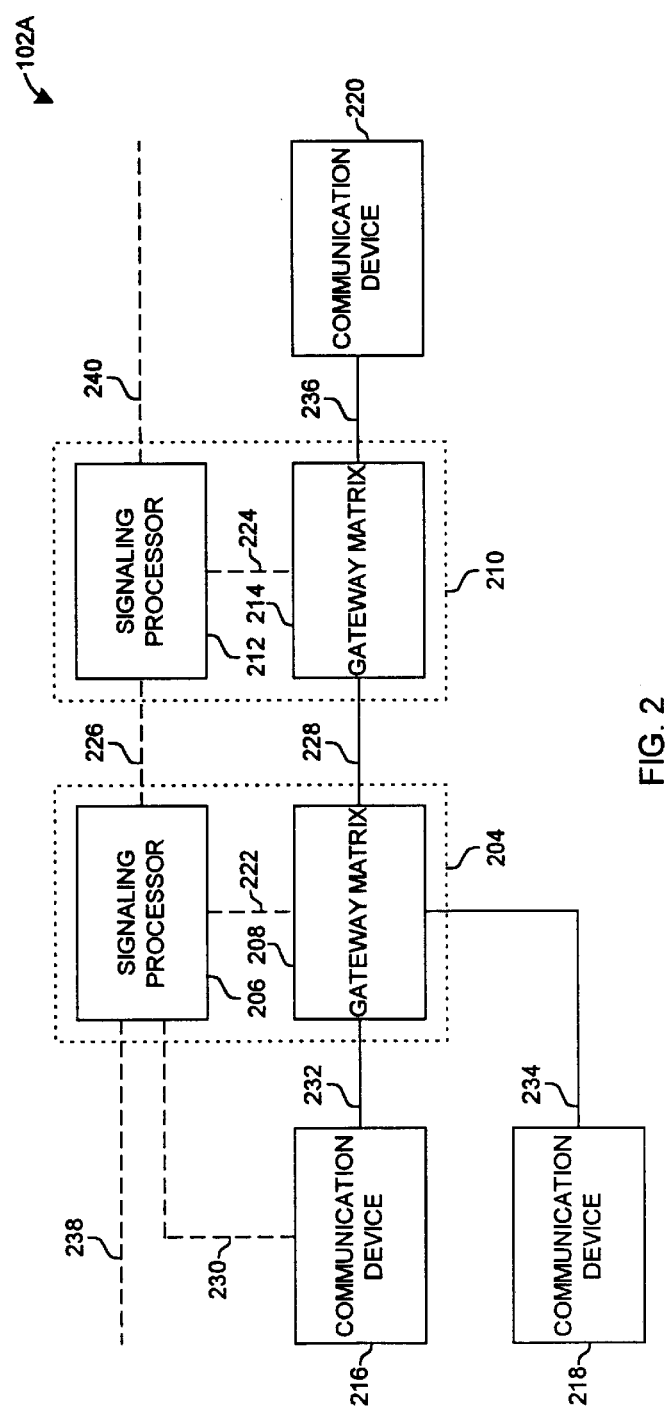
FIG. 2 is a block diagram of a call connection system having a gateway system with a gateway matrix in accordance with an embodiment of the present invention.

FIG. 2 illustrates an exemplary embodiment of the call connection system of the present invention. The call connection system 102A has a first gateway system 204 with a first signaling processor 206 and a first gateway matrix 208 and a second gateway system 210 with a second signaling processor 212 and a second gateway matrix 214. The call connection system 102A also has a first communication device 216, a second communication device 218, and a third communication device 220.

The first signaling processor 206 is linked to the gateway matrix 208 by a link 222. The second signaling processor 212 is linked to the gateway matrix 214 by a link 224. The first and second signaling processors 206 and 212 are linked by a link 226. The first and second gateway systems 208 and 214 are connected by a connection 228. The first communication device 216 is linked to the first gateway system 204 by a link 230 and connected to the first gateway system by a connection 232. The second communication device 218 is connected to the first gateway system 204 by a connection 234. The third communication device 220 is connected to the second gateway system 206 by a connection 236. Links 238 and 240 link to the first gateway system 204 and the second gateway system 206, respectively.

The first and second gateway systems 204 and 210 are the same as the gateway systems described above. The communication devices 116, 118, and 120 are the same as the communication devices described above.

The signaling processors 206 and 212 are signaling platforms that can receive, process, and generate call signaling. Based on the processed call signaling, the signaling processors 206 and 212 select processing options, services, or resources for the user communications and generate and transmit control messages that identify the communication device, processing option, service, or resource that is to be used. The signaling processors 206 and 212 also select virtual connections and circuit-based connections for call routing and generate and transport control messages that identify the selected connections. The signaling processors 206 and 212 can process various forms of signaling, including ISDN, GR-303, B-ISDN, SS7, and C7.

The gateway matrixes 208 and 214 are controllable ATM matrixes that establish connections in response to control messages received from the signaling processors 206 and 212. The gateway matrixes 208 and 214 connect ATM connections with other ATM connections by changing the cell header for an ATM cell to identify a VP/VC for a connection. The gateway matrixes 208 and 214 transmit and receive call signaling and user communications over the connections. Typically, the gateway matrixes 208 and 214 transmit call signaling to and from the signaling processors 206 and 212.

The system of FIG. 2 operates as follows. In a first example, the first communication device 216 is a network switch, and the first gateway system 204 is a part of the network with the first communication device. The third communication device 220 is a network switch, and the second gateway system 210 is a part of the network with the third communication device.

The first communication device 216 receives a call which has a destination address, such as an E.164 address residing on a node in another network, which the first communication device does not recognize. E.164 is a standard for a world dialing plan for international numbers. The first communication device 216 determines that the destination is outside of its network boundaries and sends the call to the first signaling processor 206 of the first gateway system 204.

The first signaling processor 206 processes the call signaling of the call and determines that the call is to be routed to the second gateway system 210 which is in another network with the third communication device 220. The first signaling processor 206 transmits a control message to the gateway matrix 208 identifying a connection 228 over which to connect the user communications of the call. Also, the first signaling processor 206 transmits new call signaling to the second signaling processor 212 of the second gateway system 210 identifying the connection 228.

The first gateway matrix 208 receives the user communications over the connection 232 and receives the control message from the signaling processor 206. The first gateway matrix 208 connects the user communications on the VP/VC of the selected connection 228.

The second signaling processor 212 receives the new call signaling and processes it to determine a connection for the user communications. The second signaling processor 212 determines that the user communications are to be connected over a VP/VC on the connection 236 and transmits a control message to the second gateway matrix 214 identifying the connection.

The second gateway matrix 214 receives the user communications over the VP/VC on the connection 228 and receives the control message from the second signaling processor 212. In response to the control message, the second gateway matrix 214 connects the user communications from the VP/VC on the connection 228 to the VP/VC on the connection 236. The third communication device 220 receives the user communications over the connection 236.

In another example, the second communication device 218 is an ATM network switch, and the first gateway system 204 is a part of the network with the first communication device. The third communication device 220 is another ATM network switch, and the second gateway system 210 is a part of the network with the third communication device.

The second communication device 218 receives a call which has a destination address, such as an E.164 address, outside of its network boundaries. The second communication device 218 sends the call to the first gateway system 204.

The first signaling processor 206 receives the call signaling through a link. The link may connect to the link 238, or it may be a VP/VC on the connection 234 through the first gateway matrix 208. The first signaling processor 206 processes the call signaling and determines that the call is to be routed to the second gateway system 210 which is in another network with the third communication device 220. The first signaling processor 206 transmits a control message to the gateway matrix 208 identifying a VP/VC on the connection 228 over which to connect the user communications. Also, the first signaling processor 206 transmits new call signaling to the second signaling processor 212 identifying the VP/VC on the connection 228.

The first gateway matrix 208 receives the user communications over a VP/VC on the connection 234 and receives the control message from the signaling processor 206. The first gateway matrix 208 connects the user communications from the VP/VC on the connection 234 over the VP/VC of the connection 228.

The second signaling processor 212 receives the call signaling and processes it to determine a connection for the user communications. The second signaling processor 212 determines that the user communications are to be connected over a VP/VC on the connection 236 and transmits a control message to the second gateway matrix 214 identifying the connection.

The second gateway matrix 214 receives the user communications over the VP/VC on the connection 228 and receives the control message from the second signaling processor 212. In response to the control message, the second gateway matrix connects the user communications 214 from the VP/VC on the connection 228 over the VP/VC on the connection 236. The third communication device 220 receives the user communications over the connection 236.

The Controllable ATM Matrix

Figure 3:
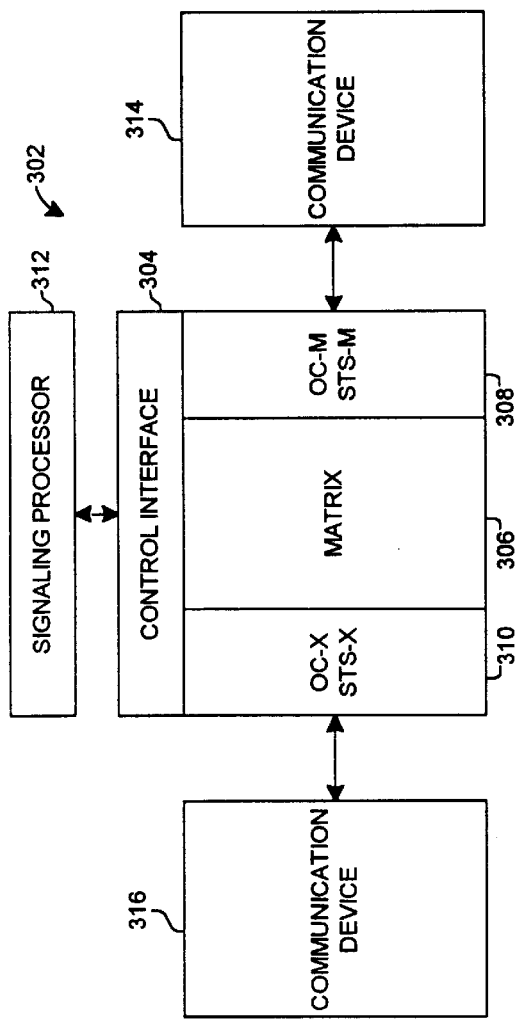
FIG. 3 is a functional diagram of a controllable asynchronous transfer mode matrix in accordance with the present invention.

FIG. 3 illustrates an exemplary embodiment of a controllable asynchronous transfer mode (ATM) matrix (CAM), but other CAMs that support the requirements of the invention also are applicable. The CAM 302 may receive and transmit ATM formatted user communications or call signaling.

The CAM 302 preferably has a control interface 304, a controllable ATM matrix 306, an optical carrier-M/ synchronous transport signal-M (OC-M/STS-M) interface 308, and an OC-X/STS-X interface 310. As used herein in conjunction with OC or STS, "M" refers to an integer, and "X" refers to an integer.

The control interface 304 receives control messages originating from the signaling processor 312, identifies virtual connection assignments in the control messages, and provides these assignments to the matrix 306 for implementation. The control messages may be received over an ATM virtual connection and through either the OC-M/STS-M interface 308 or the OC-X/STS-X interface 310 through the matrix 306 to the control interface 304, through either the OC-M/STS-M interface or the OC-X/STS-X interface directly to the control interface, or through the control interface from a link.

The matrix 306 is a controllable ATM matrix that provides cross connect functionality in response to control messages from the signaling processor 312. The matrix 306 has access to virtual path/virtual channels (VP/VCs) over which it can connect calls. For example, a call can come in over a VP/VC through the OC-M/STS-M interface 308 and be connected through the matrix 306 over a VP/VC through the OC-X/STS-X interface 310 in response to a control message received by the signaling processor 312 through the control interface 304. Alternately, a call can be connected in the opposite direction. In addition, the a call can be received over a VP/VC through the OC-M/STS-M interface 308 or the OC-X/STS-X interface 310 and be connected through the matrix 306 to a different VP/VC on the same OC-M/STS-M interface or the same OC-X/STS-X interface.

The OC-M/STS-M interface 308 is operational to receive ATM cells from the matrix 306 and to transmit the ATM cells over a connection to the communication device 314. The OC-M/STS-M interface 308 also may receive ATM cells in the OC or STS format and transmit them to the matrix 306.

The OC-X/STS-X interface 310 is operational to receive ATM cells from the matrix 306 and to transmit the ATM cells over a connection to the communication device 316. The OC-X/STS-X interface 310 also may receive ATM cells in the OC or STS format and transmit them to the matrix 306.

Call signaling may be received through and transferred from the OC-M/STS-M interface 308. Also, call signaling may be received through and transferred from the OC-X/STS-X interface 310. The call signaling may be connected on a connection or transmitted to the control interface directly or via the matrix 306.

The signaling processor 312 is configured to send control messages to the CAM 302 to implement particular features on particular VP/VC circuits. Alternatively, lookup tables may be used to implement particular features for particular VP/VCs.

Figure 4:
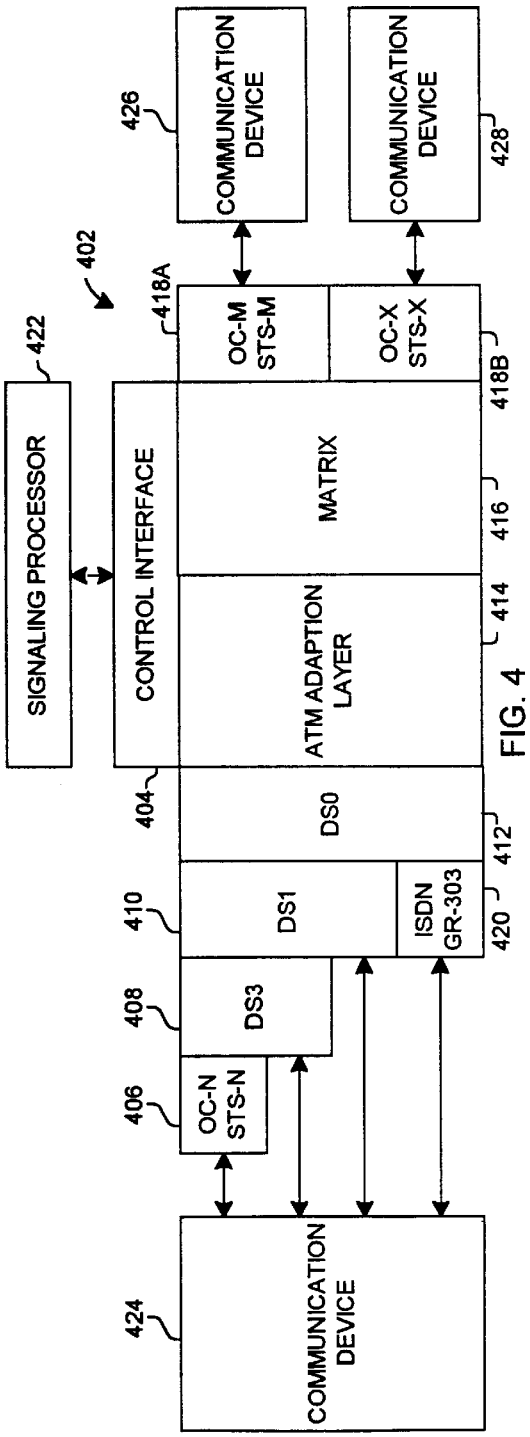
FIG. 4 is a functional diagram of a controllable asynchronous transfer mode matrix with time division multiplex capability in accordance with the present invention.

FIG. 4 illustrates another exemplary embodiment of a CAM which has time division multiplex (TDM) capability, but other CAMs that support the requirements of the invention also are applicable. The CAM 402 may receive and transmit in-band and out-of-band signaled calls.

The CAM 402 preferably has a control interface 404, an OC-N/STS-N interface 406, a digital signal level 3 (DS3) interface 408, a DS1 interface 410, a DS0 interface 412, an ATM adaptation layer (AAL) 414, a controllable ATM matrix 416, an OC-M/STS-M interface 418A, an OC-X/STS-X interface 418B, and an ISDN/GR-303 interface 420. As used herein in conjunction with OC or STS, "N" refers to an integer, "M" refers to an integer, and "X" refers to an integer.

The control interface 404 receives control messages originating from the signaling processor 422, identifies DS0 and virtual connection assignments in the control messages, and provides these assignments to the AAL 414 or the matrix 416 for implementation. The control messages may be received over an ATM virtual connection and through the OC-M/STS-M interface 418A to the control interface 404, through the OC-X/STS-X interface 418B and the matrix 416 to the control interface, or directly through the control interface from a link.

The OC-N/STS-N interface 406, the DS3 interface 408, the DS1 interface 410, the DS0 interface 412, and the ISDN/GR-303 interface 420 each can receive user communications from a communication device 424. Likewise, the OC-M/STS-M interface 418A and the OC-X/STS-X interface 418B can receive user communications from the communication devices 426 and 428.

The OC-N/STS-N interface 406 receives OC-N formatted user communications and STS-N formatted user communications and converts the user communications to the DS3 format. The DS3 interface 408 receives user communications in the DS3 format and converts the user communications to the DS1 format. The DS3 interface 408 can receive DS3s from the OC-N/STS-N interface 406 or from an external connection. The DS1 interface 410 receives the user communications in the DS1 format and converts the user communications to the DS0 format. The DS1 interface 410 receives DS1s from the DS3 interface 408 or from an external connection. The DS0 interface 412 receives user communications in the DS0 format and provides an interface to the AAL 414. The ISDN/GR-303 interface 420 receives user communications in either the ISDN format or the GR-303 format and converts the user communications to the DS0 format. In addition, each interface may transmit user communications in like manner to the communication device 424.

The OC-M/STS-M interface 418A is operational to receive ATM cells from the AAL 414 or from the matrix 416 and to transmit the ATM cells over a connection to the communication device 426. The OC-M/STS-M interface 418A also may receive ATM cells in the OC or STS format and transmit them to the AAL 414 or to the matrix 416.

The OC-X/STS-X interface 418B is operational to receive ATM cells from the AAL 414 or from the matrix 416 and to transmit the ATM cells over a connection to the communication device 428. The OC-X/STS-X interface 418B also may receive ATM cells in the OC or STS format and transmit them to the AAL 414 or to the matrix 416.

Call signaling may be received through and transferred from the OC-N/STS-N interface 406 and the ISDN/GR-303 interface 420. Also, call signaling may be received through and transferred from the OC-M/STS-M interface 418A and the OC-X/STS-X interface 418B. The call signaling may be connected on a connection or transmitted to the control interface directly or via an interface as explained above.

The AAL 414 comprises both a convergence sublayer and a segmentation and reassembly (SAR) sublayer. The AAL 414 obtains the identity of the DS0 and the ATM VP/VC from the control interface 404. The AAL 414 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for voice calls is described in U.S. Pat. No. 5,706,553 entitled "Cell Processing for Voice Transmission," which is incorporated herein by reference.

Calls with multiple 64 Kilo-bits per second (Kbps) DS0s are known as N×64 calls. If desired, the AAL 414 can be configured to accept control messages through the control interface 404 for N×64 calls. The CAM 402 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 416 is a controllable ATM matrix that provides cross connect functionality in response to control messages from the signaling processor 422. The matrix 416 has access to VP/VCs over which it can connect calls. For example, a call can come in over a VP/VC through the OC-M/STS-M interface 418A and be connected through the matrix 416 over a VP/VC through the OC-X/STS-X interface 418B in response to a control message received by the signaling processor 422 through the control interface 404. Alternately, the matrix 416 may transmit a call received over a VP/VC through the OC-M/STS-M interface 418A to the AAL 414 in response to a control message received by the signaling processor 422 through the control interface 404. Communications also may occur in opposite directions through the various interfaces.

In some embodiments, it may be desirable to incorporate digital signal processing capabilities, for example, at the DS0 level. It also may be desired to apply echo control to selected DS0 circuits. In these embodiments, a signal processor may be included. The signaling processor 422 is configured to send control messages to the CAM 402 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 5 illustrates an exemplary embodiment of an interworking unit which is an ATM interworking unit 502 suitable for the present invention for use with a SONET system. Other interworking units that support the requirements of the invention also are applicable. The ATM interworking unit 502 may receive and transmit in-band and out-of-band calls.

The ATM interworking unit 502 preferably has a control interface 504, an OC-N/STS-N interface 506, a DS3 interface 508, a DS1 interface 510, a DS0 interface 512, a signal processor 514, an AAL 516, an OC-M/STS-M interface 518, and an ISDN/GR-303 interface 520. As used herein in conjunction with OC or STS, "N" refers to an integer, and "M" refers to an integer.

The control interface 504 receives control messages originating from the signaling processor 522, identifies DS0 and virtual connection assignments in the control messages, and provides these assignments to the AAL 516 for implementation. The control messages are received over an ATM virtual connection and through the OC-M/STS-M interface 518 to the control interface 504 or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518 can receive user communications from a communication device 526.

The OC-N/STS-N interface 506 receives OC-N formatted user communications and STS-N formatted user communications and demultiplexes the user communications to the DS3 format. The DS3 interface 508 receives user communications in the DS3 format and demultiplexes the user communications to the DS1 format. The DS3 interface 508 can receive DS3s from the OC-N/STS-N interface 506 or from an external connection. The DS1 interface 510 receives the user communications in the DS1 format and demultiplexes the user communications to the DS0 format. The DS1 interface 510 receives DS1s from the DS3 interface 508 or from an external connection. The DS0 interface 512 receives user communications in the DS0 format and provides an interface to the AAL 516. The ISDN/GR-303 interface 520 receives user communications in either the ISDN format or the GR-303 format and converts the user communications to the DS0 format. In addition, each interface may transmit user communications in like manner to the communication device 524.

The OC-M/STS-M interface 518 is operational to receive ATM cells from the AAL 516 and to transmit the ATM cells over the connection to the communication device 526. The OC-M/STS-M interface 518 also may receive ATM cells in the OC or STS format and transmit them to the AAL 516.

Call signaling may be received through and transferred from the OC-N/STS-N interface 506 and the ISDN/GR-303 interface 520. Also, call signaling may be received through and transferred from the OC-M/STS-M interface 518. The call signaling may be connected on a connection or transmitted to the control interface directly or via another interface as explained above.

The AAL 516 comprises both a convergence sublayer and a segmentation and reassembly (SAR) sublayer. The AAL 516 obtains the identity of the DS0 and the ATM VP/VC from the control interface 504. The AAL 516 is operational to convert between the DS0 format and the ATM format.

If desired, the AAL 516 can be configured to accept control messages through the control interface 504 for N×64 calls. The ATM interworking unit 502 is able to interwork, multiplex, and demultiplex for multiple DS0s.

DS0 connections are bidirectional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 514 is included either separately (as shown) or as a part of the DS0 interface 512. The signaling processor 522 is configured to send control messages to the ATM interworking unit 502 to implement particular features on particular DS0 circuits. Alternatively, lookup tables may be used to implement particular features for particular circuits or VP/VCs.

FIG. 6 illustrates another exemplary embodiment of an interworking unit which is an ATM interworking unit 602 suitable for the present invention for use with an SDH system. The ATM interworking unit 602 preferably has a control interface 604, an STM-N electrical/optical (E/O) interface 606, an E3 interface 608, an E1 interface 610, an E0 interface 612, a signal processor 614, an AAL 616, an STM-M electrical/optical (E/O) interface 618, and a DPNSS interface 620. As used herein in conjunction with STM, "N" refers to an integer, and "M" refers to an integer.

The control interface 604 receives control messages from the signaling processor 622, identifies E0 and virtual connection assignments in the control messages, and provides these assignments to the AAL 616 for implementation. The control messages are received over an ATM virtual connection and through the STM-M interface 618 to the control interface 504 or directly through the control interface from a link.

The STM-N E/O interface 606, the E3 interface 608, the E1 interface 610, the E0 interface 612, and the DPNSS interface 620 each can receive user communications from a second communication device 624. Likewise, the STM-M E/O interface 618 can receive user communications from a third communication device 626.

The STM-N E/O interface 606 receives STM-N electrical or optical formatted user communications and converts the user communications from the STM-N electrical or STM-N optical format to the E3 format. The E3 interface 608 receives user communications in the E3 format and demultiplexes the user communications to the E1 format. The E3 interface 608 can receive E3s from the STM-N E/O interface 606 or from an external connection. The E1 interface 610 receives the user communications in the E1 format and demultiplexes the user communications to the E0 format. The E1 interface 610 receives E1s from the STM-N E/O interface 606 or the E3 interface 608 or from an external connection. The E0 interface 612 receives user communications in the E0 format and provides an interface to the AAL 616. The DPNSS interface 620 receives user communications in the DPNSS format and converts the user communications to the E0 format. In addition, each interface may transmit user communications in a like manner to the communication device 624.

The STM-M E/O interface 618 is operational to receive ATM cells from the AAL 616 and to transmit the ATM cells over the connection to the communication device 626. The STM-M E/O interface 618 may also receive ATM cells in the STM-M E/O format and transmit them to the AAL 616.

Call signaling may be received through and transferred from the STM-N E/O interface 606 and the DPNSS interface 620. Also, call signaling may be received through and transferred from the STM-M E/O interface 618. The call signaling may be connected on a connection or transmitted to the control interface directly or via another interface as explained above.

The AAL 616 comprises both a convergence sublayer and a segmentation and reassembly (SAR) sublayer. The AAL obtains the identity of the E0 and the ATM VP/VC from the control interface 604. The AAL 616 is operational to convert between the E0 format and the ATM format, either in response to a control instruction or without a control instruction. AAL's are known in the art. If desired, the AAL 616 can be configured to receive control messages through the control interface 604 for N×64 user communications.

E0 connections are bidirectional and ATM connections typically are unidirectional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 614 is included either separately (as shown) or as a part of the E0 interface 612. The signaling processor 622 is configured to send control messages to the ATM interworking unit 602 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," filed on Feb. 20, 1998, which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 7:
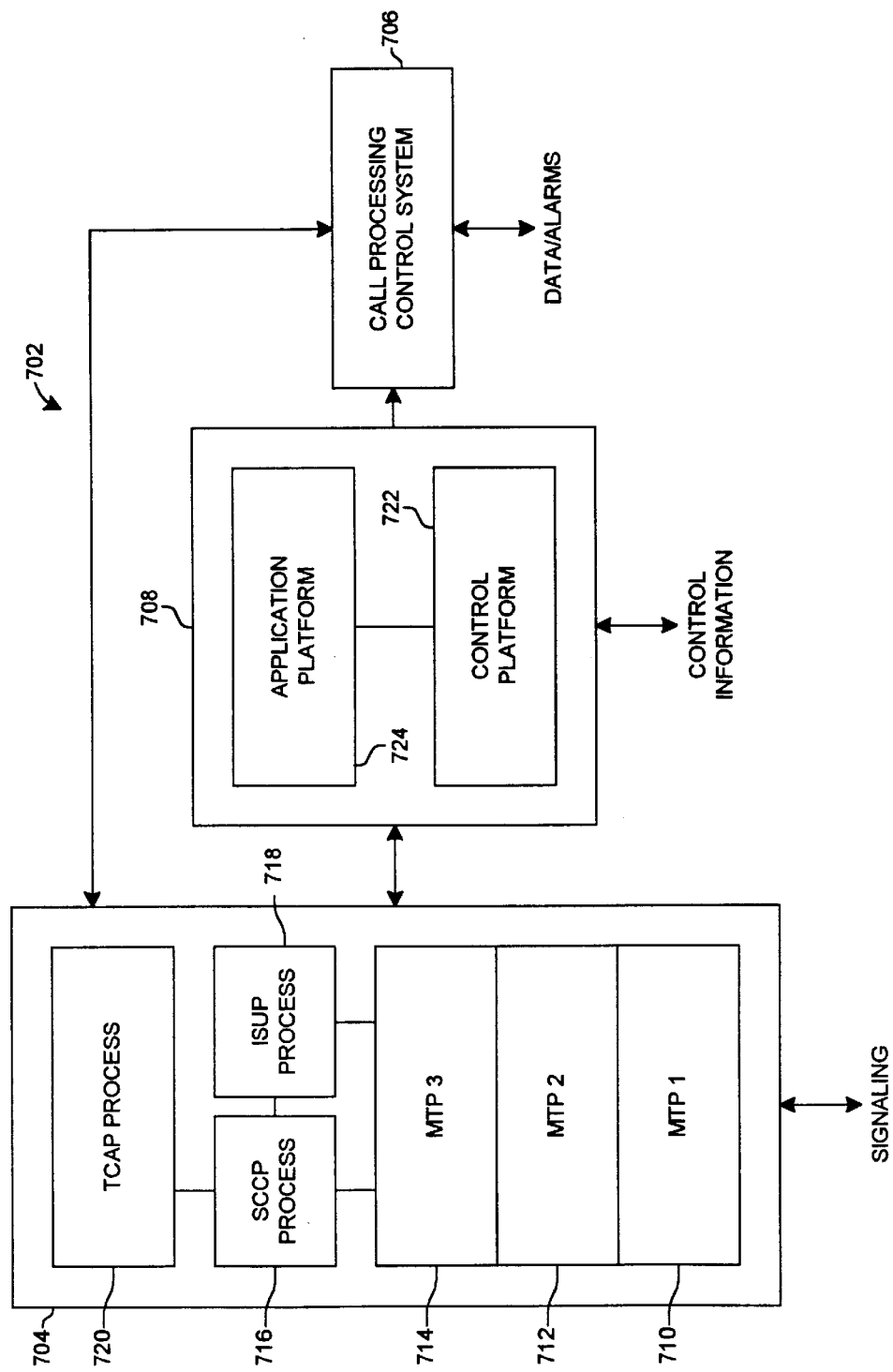
FIG. 7 is a block diagram of a signaling processor constructed in accordance with the present system.

FIG. 7 depicts an embodiment of a signaling processor. Other versions also are contemplated. In the embodiment of FIG. 7, the signaling processor 702 has a signaling interface 704, a call processing control system 706 (CPCS), and a call processor 708. It will be appreciated that the signaling processor 702 may be constructed as modules in a single unit or as multiple units.

The signaling interface 704 is coupled externally to signaling systems—preferably to signaling systems having a message transfer part (MTP), an ISDN user part (ISUP), a signaling connection control part (SCCP), an intelligent network application part (INAP), and a transaction capabilities application part (TCAP). The signaling interface 704 preferably is a platform that comprises an MTP level 1 710, an MTP level 2 712, an MTP level 3 714, an SCCP process 716, an ISUP process 718, and a TCAP process 720. The signaling interface 704 also has INAP functionality.

The signaling interface 704 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 704 is operational to transmit, process, and receive call signaling. The TCAP, SCCP, ISUP, and INAP functionality use the services of the MTP to transmit and receive the messages. Preferably, the signaling interface 704 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 704 process information that is received in message signal units (MSUs) and convert the information to call information elements that are sent to the call processor 708 to be processed. A call information element may be, for example, an ISUP IAM message parameter from the MSU. The signaling interface 704 strips the unneeded header information from the MSU to isolate the message information parameters and passes the parameters to the call processor 708 as the call information elements. Examples of these parameters are the called number, the calling number, and user service information. Other examples of messages with information elements are an ANM, an ACM, an REL, an RLC, and an INF. In addition, call information elements are transferred from the call processor 708 back to the signaling interface 704, and the information elements are reassembled into MSUs and transferred to a signaling point.

The CPCS 706 is a management and administration system. The CPCS 706 is the user interface and external systems interface into the call processor 708. The CPCS 706 serves as a collection point for call-associated data such as logs, operational measurement data, statistical information, accounting information, and other call data. The CPCS 706 can configure the call-associated data and/or transmit it to reporting centers.

The CPCS 706 accepts data, such as the translations, from a source such as an operations system and updates the data in the tables in the call processor 708. The CPCS 706 ensures that this data is in the correct format prior to transferring the data to the call processor 708. The CPCS 706 also provides configuration data to other devices including the call processor 708, the signaling interface 704, the interworking unit (not shown), and the controllable ATM matrix (not shown). In addition, the CPCS 706 provides for remote control of call monitoring and call tapping applications from the call processor 708.

The CPCS 706 also serves as a collection point for alarms. Alarm information is transferred to the CPCS 706. The CPCS 706 then transports alarm messages to the required communication device. For example, the CPCS 706 can transport alarms to an operations center.

The CPCS 706 also has a human-machine interface (HMI). This allows a person to log onto the CPCS 706 and manage data tables or review data tables in the CPCS or provide maintenance services.

The call processor 708 processes call signaling and controls an ATM interworking unit, such as an ATM interworking multiplexer (mux) that performs interworking of DS0s and VP/VCs, and an ATM matrix. However, the call processor 708 may control other communications devices and connections in other embodiments.

The call processor 708 comprises a control platform 722 and an application platform 724. Each platform 722 and 724 is coupled to the other platform.

The control platform 722 is comprised of various external interfaces including an interworking unit interface, a controllable ATM matrix, an echo interface, a resource control interface, a call information interface, and an operations interface. The control platform 722 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 706. Typical call information includes accounting information, such as the parties to the call, time points for the call, and any special features applied to the call. One skilled in the art will appreciate how to produce the software for the interfaces in the control platform 722.

The application platform 724 processes signaling information from the signaling interface 704 to select connections. The identity of the selected connections are provided to the control platform 722 for the interworking unit interface and/or for the controllable ATM matrix interface. The application platform 724 is responsible for validation, translation, routing, call control, exceptions, screening, and error handling. In addition to providing the control requirements for the interworking unit and the controllable ATM matrix, the application platform 724 also provides requirements for echo control and resource control to the appropriate interface of the control platform 722. In addition, the application platform 724 generates signaling information for transmission by the signaling interface 704. The signaling information might be for ISUP, INAP, or TCAP messages to external network elements. Pertinent information for each call is stored in an enhanced circuit data block (ECDB) for the call. The ECDB can be used for tracking and accounting the call.

The application platform 724 preferably operates in general accord with the Basic Call State Model (BCSM) defined by the ITU. An instance of the BCSM is created to handle each call. The BCSM includes an originating process and a terminating process. The application platform 724 includes a service switching function (SSF) that is used to invoke the service control function (SCF). Typically, the SCF is contained in an SCP. The SCF is queried with TCAP or INAP messages that are transported by the signaling interface 704 and which are initiated with information from the SSF in the application platform 724. The originating or terminating processes will access remote databases with intelligent network (IN) functionality via the SSF.

Software requirements for the application platform 724 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 708 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 7, it can be seen that the application platform 724 processes signaling information to control numerous systems and facilitate call connections and services. The SS7 signaling is exchanged between the call processor 708 and external components through the signaling interface 704, and control information is exchanged with external systems through the control platform 722. Advantageously, the signaling interface 704, the CPCS 706, and the call processor 708 are not integrated into a switch central processing unit (CPU) that is coupled to a switching matrix. Unlike an SCP, the components of the signaling processor 702 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 8:
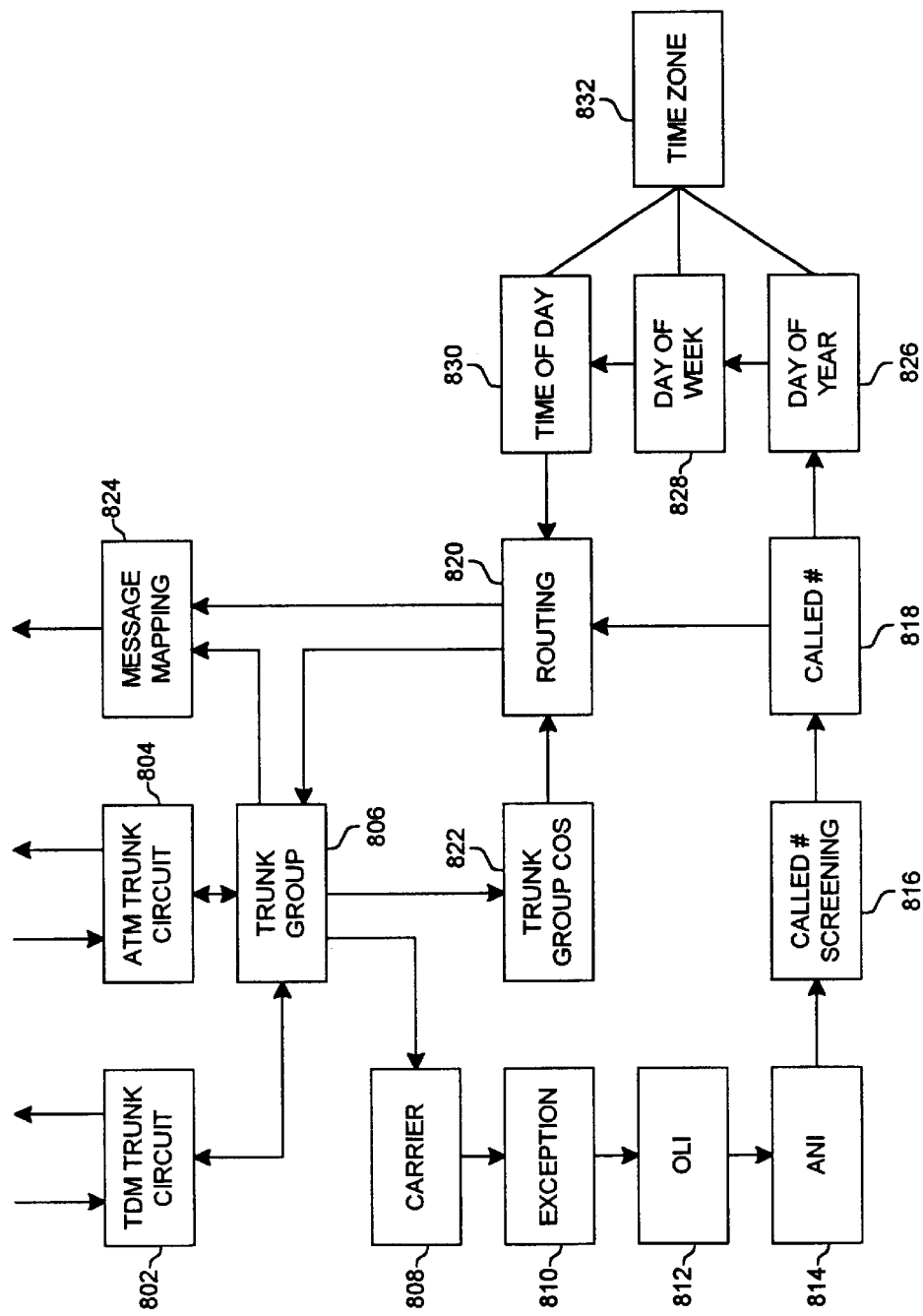
FIG. 8 is a block diagram of a data structure having tables that are used in the signaling processor of FIG. 7.

FIG. 8 depicts an exemplary data structure preferably used by the call processor 702 of FIG. 7 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 8.

The primary data structure has a TDM trunk circuit table 802, an ATM trunk circuit table 804, a trunk group table 806, a carrier table 808, an exception table 810, an originating line information (OLI) table 812, an automatic number identification (ANI) table 814, a called number screening table 816, a called number table 818, a routing table 820, a trunk group class of service (COS) table 822, and a message mapping table 824. Also included in the data structure are a day of year table 826, a day of week table 828, a time of day table 830, and a time zone table 832.

The TDM trunk circuit table 802 contains information required to provision the TDM side of a connection from the call processor site. Each circuit on the TDM side of a connection has an entry. The TDM trunk circuit table 802 is accessed from the trunk group table 806 or an external call process, and it points to the trunk group table.

The ATM trunk circuit table 804 contains information required to provision the ATM side of a connection. Typically, one record appears in this table per ATM trunk group. Although, the system can be configured alternately for multiple records per trunk group. The ATM trunk circuit table 804 is accessed from the trunk group table 806 or an external call process, and it points to the trunk group table.

The trunk group table 806 contains information that is required to build trunk groups out of different trunk members identified in the TDM and ATM trunk circuit tables 802 and 804. The trunk group table 806 contains information related to the originating and terminating trunk groups. The trunk group table 806 typically points to the carrier table 808. Although, the trunk group table 806 may point to the exception table 810, the OLI table 812, the ANI table 814, the called number screening table 816, the called number table 818, the routing table 820, the day of year table 826, the day of week table 828, the time of day table 830, and the treatment table (see FIG. 9).

For default processing of an IAM of an outgoing call in the forward direction, when the call process determines call setup and routing parameters for user communications on the originating portion, the trunk group table 806 is the next table after the TDM and ATM trunk circuit tables 802 and 804, and the trunk group table points to the carrier table 808. For default processing of an IAM of an outgoing call in the forward direction, when the call process determines call setup and routing parameters for user communications on the terminating portion, the trunk group table 806 is the next table after the routing table 820, and the trunk group table points to the TDM or ATM trunk circuit table 802 or 804. For default processing of an ACM or an ANM of an outgoing call in the originating direction, when the call process determines parameters for signaling, the trunk group table 806 is the next table after the TDM or ATM trunk circuit table 802 or 804, and the trunk group table points to the message mapping table 824. It will be appreciated that this is the default method, and, as explained herein, other implementations of table processing occur.

The carrier table 808 contains information that allows calls to be screened based, at least in part, on the carrier information parameter and the carrier selection parameter. The carrier table 808 typically points to the exception table 810. Although, the carrier table 808 may point to the OLI table 812, the ANI table 814, the called number screening table 816, the called number table 818, the routing table 820, the day of year table 826, the day of week table 828, the time of day table 830, the treatment table (see FIG. 9), and the database services table (see FIG. 11).

The exception table 810 is used to identify various exception conditions related to the call that may influence the routing or handling of the call. The exception table 810 contains information that allows calls to be screened based, at least in part, on the called party number and the calling party's category. The exception table 810 typically points to the OLI table 812. Although, the exception table 810 can point to the ANI table 814, the called number screening table 816, the called number table 818, the routing table 820, the day of year table 826, the day of week table 828, the time of day table 830, the call rate table, the percent control table, the treatment table (see FIG. 9), and the database services table (see FIG. 11).

The OLI table 812 contains information that allows calls to be screened based, at least in part, on originating line information in an LAM. The OLI table 812 typically points to the ANI table 814. Although, the OLI table can point to the called number screening table 816, the called number table 818, the routing table 820, the day of year table 826, the day of week table 828, the time of day table 830, and the treatment table (see FIG. 9).

The ANI table 814 is used to identify any special characteristics related to the caller's number, which is commonly known as automatic number identification. The ANI table 814 is used to screen and validate an incoming ANI. ANI specific requirements such as queuing, echo cancellation, time zone, and treatments can be established. The ANI table 814 typically points to the called number screening table 816. Although, the ANI table 814 can point to the called number table 818, the routing table 820, the day of year table 826, the day of week table 828, the time of day table 830, and the treatment table (see FIG. 9).

The called number screening table 816 is used to screen called numbers. The called number screening table 816 determines the disposition of the called number and the nature of the called number. The called number screening table 816 is used to provide the trigger detection point (TDP) for an AIN SCP TCAP query. It is used, for example, with the local number portability (LNP) feature. The called number screening table can invoke a TCAP. The called number screening table 816 typically points to the called number table 818. Although, the called number screening table 816 can point to the routing table 820, the treatment table, the call rate table, the percent table (see FIG. 9), and the database services table (see FIG. 11).

The called number table 818 is used to identify routing requirements based on, for example, the called number. This will be the case for standard calls. The called number table 818 typically points to the routing table 810. In addition, the called number table 826 can be configured to alternately point to the day of year table 826. The called number table 818 can also point to the treatment table (see FIG. 9) and the database services table (see FIG. 11).

The routing table 820 contains information relating to the routing of a call for various connections. The routing table 820 typically points to the treatment table (see FIG. 9). Although, the routing table also can point to the trunk group table 806 and the database services table (see FIG. 11).

For default processing of an IAM of an outgoing call in the forward direction, when the call process determines call setup and routing parameters for user communications, the routing table 820 is the next table after the called number table 818, and the routing table points to the trunk group table 806. For default processing of an IAM of an outgoing call in the forward direction, when the call process determines parameters for signaling, the routing table 820 is the next table after the called number table 818, and the routing table points to the message mapping table 824. It will be appreciated that this is the default method, and, as explained herein, other implementations of table processing occur.

The trunk group COS table 822 contains information that allows calls to be routed differently based on the class of service assigned to the originating trunk group and to the terminating trunk group. The trunk group COS table can point to the routing table 820 or the treatment table (see FIG. 9).

When the trunk group COS table 822 is used in processing, after the routing table 820 and the trunk group table 806 are processed, the trunk group table points to the trunk group COS table. The trunk group COS table points back to the routing table 820 for further processing. Processing then continues with the routing table 820 which points to the trunk group table 806, and the trunk group table which points to the TDM or ATM trunk circuit table 802 or 804. It will be appreciated that this is the default method, and, as explained herein, other implementations of table processing occur.

The message mapping table 824 is used to provide instructions for the formatting of signaling messages from the call processor. It typically can be accessed by the routing table 820 or the trunk group table 806 and typically determines the format of the outgoing messages leaving the call processor.

The day of year table 826 contains information that allows calls to be routed differently based on the day of the year. The day of year table typically points to the routing table 820 and references the time zone table 832 for information. The day of year table 826 also can point to the called number screening table 816, the called number table 818, the routing table 820, the day of week table 828, the time of day table 830, and the treatment table (see FIG. 9).

The day of week table 828 contains information that allows calls to be routed differently based on the day of the week. The day of week table typically points to the routing table 820 and references the time zone table 832 for information. The day of week table 828 also can point to the called number screening table 816, the called number table 818, the time of day table 830, and the treatment table (see FIG. 9).

The time of day table 830 contains information that allows calls to be routed differently based on the time of the day. The time of day table 830 typically points to the routing table 820 and references the time zone table 832 for information. The time of day table 830 also can point to the called number screening table 816, the called number table 818, and the treatment table (see FIG. 9).

The time zone table 832 contains information that allows call processing to determine if the time associated with the call processing should be offset based on the time zone or daylight savings time. The time zone table 832 is referenced by, and provides information to, the day of year table 826, the day of week table 828, and the time of day table 830.

Figure 9:
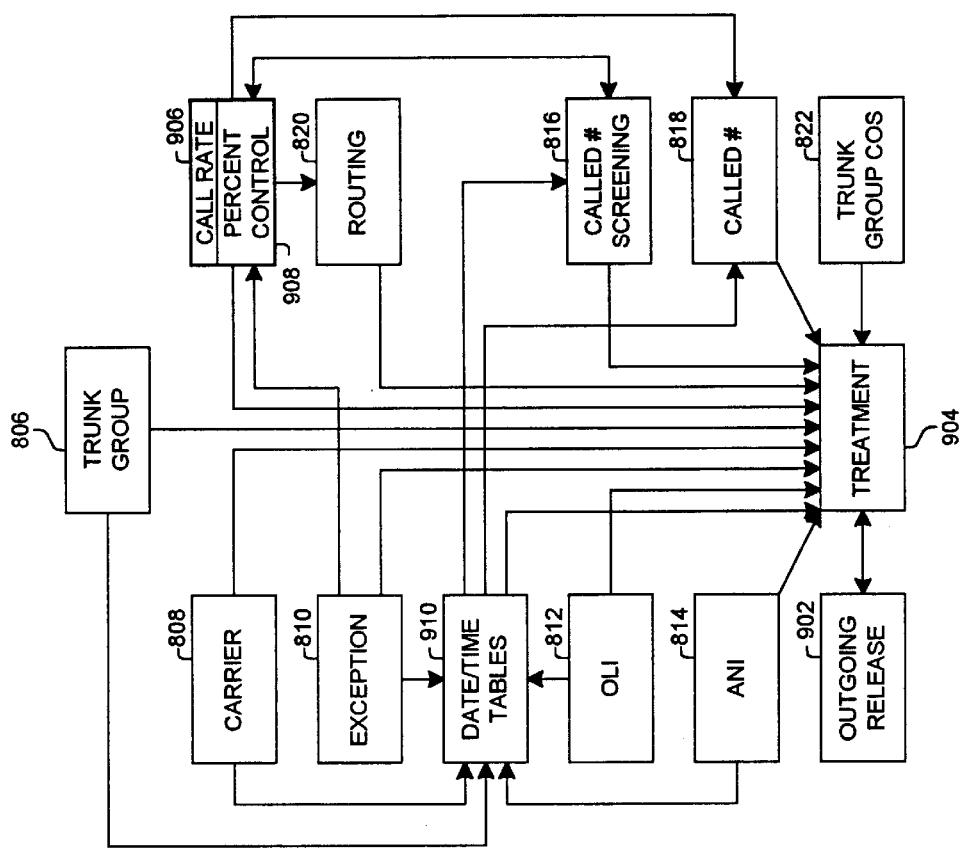
FIG. 9 is a block diagram of additional tables that are used in the signaling processor of FIG. 7.

FIG. 9 is an overlay of FIG. 8. The tables from FIG. 8 are present. However, for clarity, the table's pointers have been omitted, and some tables have not been duplicated in FIG. 9. FIG. 9 illustrates additional tables that can be accessed from the tables of FIG. 8. These include an outgoing release table 902, a treatment table 904, a call rate table 906, and a percent control table 908, and time/date tables 910.

The outgoing release table 902 contains information that allows call processing to determine how an outgoing release message is to be formatted. The outgoing release table 902 typically points to the treatment table 906.

The treatment table 904 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 904 typically points to the outgoing release table 902 and the database services table (see FIG. 10).

The call rate table 906 contains information that is used to control call attempts on an attempt per second basis. Preferably, attempts from 100 per second to 1 per minute are programmable. The call rate table 906 typically points to the called number screening table 816, the called number table 818, the routing table 820, and the treatment table 904.

The percent control table 908 contains information that is used to control call attempts based upon a percent value of the traffic that is processed through call processing. The percent control table 908 typically points to the called number screening table 816, the called number table 818, the routing table 820, and the treatment table 904.

The date/time tables 910 have been identified in FIG. 8 as the day of year table 826, the day of week table 828, the time of day table 826, and the time zone table 832. They are illustrated in FIG. 9 as a single location for ease and clarity but need not be so located.

Figure 10:
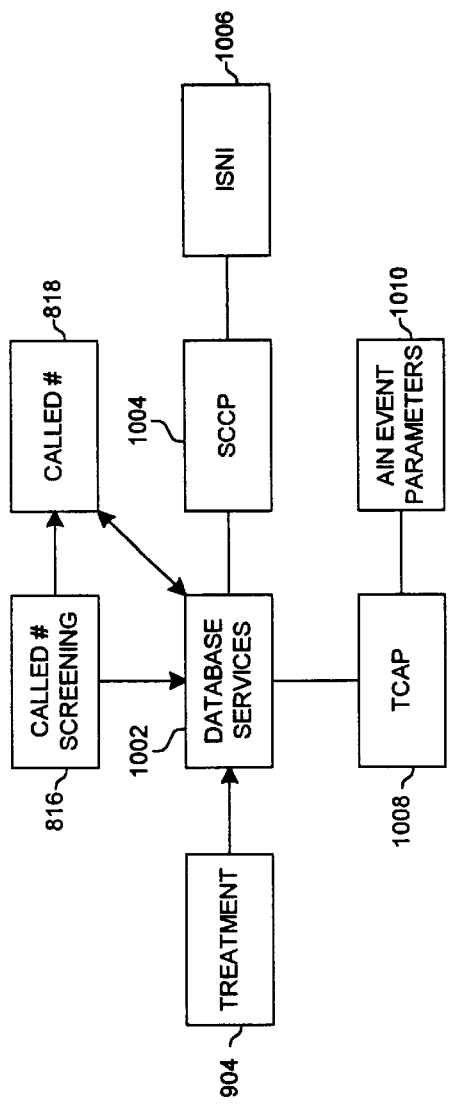
FIG. 10 is a block diagram of additional tables that are used in the signaling processor of FIG. 7.

FIG. 10 is an overlay of FIGS. 8–9. The tables from FIGS. 8–9 are present. However, for clarity, the table's pointers have been omitted, and some tables have not been duplicated in FIG. 10.

FIG. 10 illustrates additional tables that can be accessed from the tables of FIGS. 8–9 and which are directed to the TCAP and the SCCP message processes. These include a database services table 1002, a signaling connection control part (SCCP) table 1004, an intermediate signaling network identification (ISNI) table 1006, a transaction capabilities application part (TCAP) table 1008, and an advanced intelligent network (AIN) event parameters table 1010.

The database services table 1002 contains information about the type of database service requested by call processing. The database services table 1002 references and obtains information from the SCCP table 1004 and the TCAP table 1008. After the database function is performed, the call is returned to normal call processing. The database services table 1002 points to the called number table 818.

The SCCP table 1004 contains information and parameters required to build an SCCP message. The SCCP table 1004 is referenced by the database services table 1002 and provides information to the database services table.

The ISNI table 1006 contains network information that is used for routing SCCP message to a destination node. The ISNI table 1006 is referenced by the SCCP table 1004 and provides information to the SCCP table.

The TCAP table 1008 contains information and parameters required to build a TCAP message. The TCAP table 1008 is referenced by the database services table 1002 and provides information to the database services table.

The AIN event parameters table 1010 contains information and parameters that are included in the parameters portion of a TCAP event message. The AIN event parameters table 1010 is referenced by the TCAP table 1008 and provides information to the TCAP table.

Figure 11:
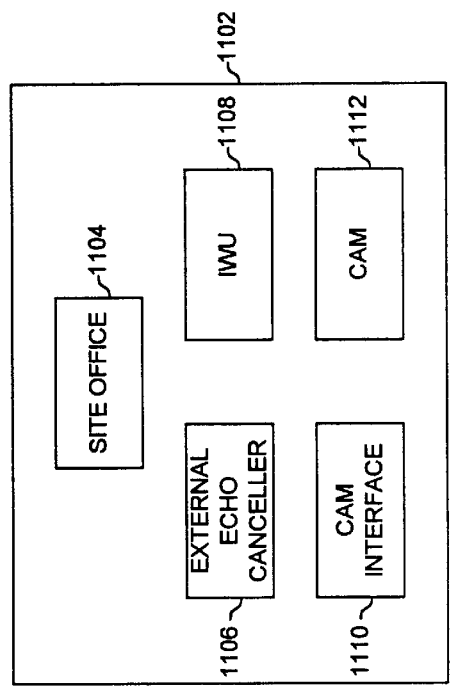
FIG. 11 is a block diagram of additional tables that are used in the signaling processor of FIG. 7.

FIG. 11 is an overlay of FIGS. 8–10. The tables from FIGS. 8–10 are present. However, for clarity, the tables have not been duplicated in FIG. 11. FIG. 11 illustrates additional tables that can be used to setup the call process so that the tables of FIGS. 8–10 may be used. These setup tables 1102 include a site office table 1104, an external echo canceller table 1106, an interworking unit (IWU) table 1108, a controllable ATM matrix (CAM) interface table 1110, and a controllable ATM matrix (CAM) table 1112.

The site office table 1104 contains information which lists office-wide parameters, some of which are information-based and others which affect call processing. The site office table 1104 provides information to the call processor or switch during initialization or other setup procedures, such as population of data or transfer of information to one or more memory locations for use during call processing.

The external echo canceller 1106 contains information that provides the interface identifier and the echo canceller type when an external echo canceller is required. The external echo canceller table 1106 provides information to the call processor or switch during initialization or other setup procedures, such as population of data or transfer of information to one or more memory locations for use during call processing.

The IWU table 1108 contains the internet protocol (IP) identification numbers for interfaces to the interworking units at the call processor or switch site. The IWU table 1108 provides information to the call processor or switch during initialization or other setup procedures, such as population of data or transfer of information to one or more memory locations for use during call processing.

The CAM interface table 1110 contains information for the logical interfaces associated with the CAM. The CAM interface table 1110 provides information to the call processor or switch during initialization or other setup procedures, such as population of data or transfer of information to one or more memory locations for use during call processing.

The CAM table 1112 contains information associated with the logical and physical setup properties of the CAM. The CAM table 1112 provides information to the call processor or switch during initialization or other setup procedures, such as population of data or transfer of information to one or more memory locations for use during call processing.

FIGS. 12–41 depict examples of the various tables described above. It will be appreciated that other versions of tables may be used. In addition, information from the identified tables may be combined or changed to form different tables.

FIG. 12 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 13 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification cod e (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 14A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is not received in an IAM, the default JIP is a value recorded on the call processor ECDB. If an incoming IAM does not have a JIP, call processing will populate the JIP of the outgoing IAM with the default value from the trunk group table. If a JIP is not data filled, an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 14B is a continuation of FIG. 14A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require. specific release causes or treatments for a specific customer, this field identifies the type of treatment that is required. The message mapping label is a label into the message mapping table which specifies the backward message configuration that will be used on the trunk group.

FIG. 14C is a continuation of FIG. 14B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following:

connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 15 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 16 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 17 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 18 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 806.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 19 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 20 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 21 depicts an example of a day of year table. The day of year label is used as a key to enter the table. The date field indicates the local date which is applicable to the action to be taken during the processing of this table. The next function and next label identify the table and the area within that table for further call processing.

FIG. 22 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 23 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 24 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 25 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 26 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 27 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 28 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 29 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 30 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 31 depicts an example of a database services table. The database services label is used as a key to enter the table. The service type determines the type of logic that is applied when building and responding to database queries. Service types include local number portability and NOO number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 32A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 32B is a continuation of FIG. 32A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 32C is a continuation of FIG. 32B for the SCCP table. FIG. 32C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 32D is a continuation of FIG. 32C for the SCCP table. FIG. 32D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 33 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 34 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 35 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 36 depicts an example of an interworking unit interface table. The interworking unit (IWU) is a key that is used to enter the table. The IWU identification (ID) identifies which interworking unit is being addressed. The internet protocol (IP) sockets 1–4 specify the IP socket address of any of the four connections to the interworking unit.

FIG. 37 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 38 depicts an example of a controllable ATM matrix (CAM) table. The CAM label is used as a key to enter the table. The CAM type indicates the type of CAM control protocol. The CAM address identifies the address of the CAM.

FIG. 39A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 39B is a continuation of FIG. 39A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 39C is a continuation of FIG. 39B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 39D is a continuation of FIG. 39C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 40A–40B depict an example of an advanced intelligent network (AIN) event parameters table. The AIN event parameters table has two columns. The first identifies the parameters that will be included in the parameters portion of the TCAP event message. The second entry may include information for analysis.

FIG. 41 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A communication system for handling a call, comprising:
   a first signaling processor configured to receive call signaling for the call, process the call signaling to generate a first identifier, and transfer a first control message that includes the first identifier, wherein the first signaling processor is external to a switch; and
   a first gateway device configured to receive user communications for the call, receive the first control message, convert the user communications from a first format to a second format wherein the second format includes the first identifier in a header of the user communications, and transmit the user communications in the second format.

2. The communication system of claim 1 wherein the first identifier is for routing the user communications.

3. The communication system of claim 1 wherein the first identifier identifies a connection for the user communications.

4. The communication system of claim 1 wherein the first identifier identifies an ATM connection for the user communications.

5. The communication system of claim 1 wherein the first identifier identifies a VP/VC for a connection for the user communications.

6. The communication system of claim 1 further comprising:
   a first communication device coupled to the first signaling processor and the first gateway device, wherein the first communication device, the first signaling processor, and the first gateway device comprise a first network,
   the first communication device configured to receive the call, determine whether the destination of the call is outside of the first network, and transmit the call to the first signaling processor and the first gateway device responsive to the determination that the destination of the call is outside of the first network.

7. The communication system of claim 6 wherein the first signaling processor is configured to generate new call signaling and transmit the new call signaling.

8. The communication system of claim 7 further comprising a second network comprising:
   a second signaling processor configured to receive the new call signaling, process the new call signaling to generate a second identifier, and transfer a second control message that includes the second identifier; and
   a second gateway device configured to receive the user communications in the second format, receive the second control message, convert the user communications from the second format to a third format wherein the third format includes the second identifier in the header of the user communications, and transmit the user communications in the third format.

9. The communication system of claim 6 wherein the first communication device comprises a switch.

10. The communication system of claim 6 wherein the first communication device comprises an ATM switch.

11. The communication system of claim 6 wherein the first communication device comprises an ATM/TDM switch.

12. The communication system of claim 6 wherein the first communication device comprises a cross connect.

13. The communication system of claim 6 wherein the first communication device comprises a gateway system.

14. The communication system of claim 6 wherein the first communication device comprises an interworking unit.

15. The communication system of claim 6 wherein the first communication device comprises customer premises equipment.

16. The communication system of claim 15 wherein the customer premises equipment comprises a computer.

17. The communication system of claim 15 wherein the customer premises equipment comprises a private branch exchange.

18. The communication system of claim 1 wherein the first signaling processor and the first gateway device comprise a first network, and wherein the first signaling processor and the first gateway device are configured to receive calls that are destined for another network.

19. The communication system of claim 1 wherein the first gateway device comprises a gateway matrix.

20. The communication system of claim 1 wherein the first gateway device comprises an ATM matrix.

* * * * *